Dec. 23, 1958  P. H. TAKE  2,866,081
TACK WELDING ELECTRODE HOLDER
Filed June 30, 1958

INVENTOR
PERCIVAL H. TAKE
BY: *Frederick E. Bromley*
ATTORNEY

United States Patent Office 2,866,081
Patented Dec. 23, 1958

2,866,081

TACK WELDING ELECTRODE HOLDER

Percival H. Take, Halifax, Nova Scotia, Canada

Application June 30, 1958, Serial No. 745,385

5 Claims. (Cl. 219—138)

This invention relates to an improved electrode holder for arc welders whereby an individual may perform a tack welding operation with a minimum of training and skill.

A primary object of this invention is to provide a tack welding electrode holder including a novel switch assembly providing an automatic "cut-out" feature to prevent accidental fires or the like and further including means whereby a relative novice welder may initially position the electrode in its proper angular relationship relative to a work piece without a current flowing therethrough to thus enable the user of the electrode holder to avoid flashing off of the electrode and damage to the work piece or surrounding equipment.

Another object of this invention is to provide an electrode holder including a novel switch assembly which permits the user of the holder to position the electrode prior to "dropping" his helmet since current will not flow to the electrode until the operator of the holder activates the same, and after such activation current will only flow through the electrode while it is in contact with a work piece.

Other objects and advantages of the invention will become apparent from a consideration of the following description, taken in connection with the accompanying drawings, wherein an exemplary embodiment of the invention is disclosed.

Figure 1:
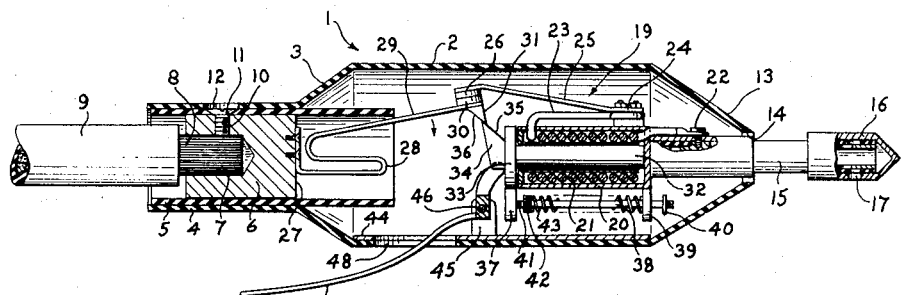
Figure 1 is a longitudinal sectional view of the electrode holder of the invention showing the parts disposed in the position wherein current will flow through the electrode holder.

Referring to the drawing in detail, indicated generally at 1 is a preferred embodiment of the novel electrode holder which includes a hollow elongated tubular body member 2 constructed of any suitable non-conductive insulating material. The body member 2 includes a rear frusto conical portion 3 terminating in an axially projecting tubular sleeve 4. Telescopically received within the sleeve 4 and projecting into the interior of the body member is a suitably secured insulating sleeve 5 which receives therein an electrical conductor 6. The conductor 6 includes a rearwardly opening blind bore portion 7 which receives therein the exposed end 8 of a cable 9. Communicating with the bore 7 is a laterally extending internally threaded bore 10 receiving therein a lock screw 11 which extends through an opening in the sleeve 5, and a suitable aligned opening 12 is provided in the sleeve 4 for permitting one to have access to the screw 11.

Figure 2:
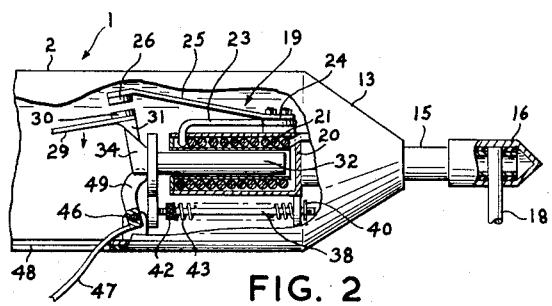
Figure 2 is a fragmentary view similar to a portion of Figure 1, showing the relative position of the parts when no current flows through the electrode holder.

The forward portion of the body member 2 is of a frusto conical shape as indicated at 13 and includes an axial opening 14 through which projects an elongated current conducting rod element 15, the end portion 16 of which includes lateral openings 17 for removably receiving therein the end of an electrode 18 as clearly seen in Figure 2.

Figure 3:
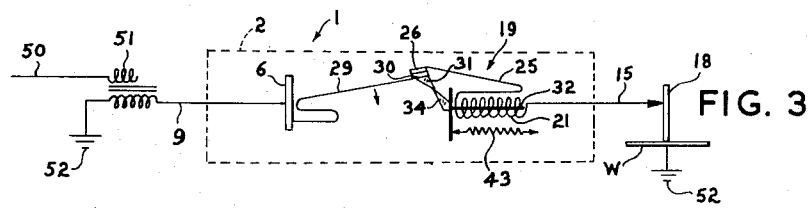
Figure 3 is a diagrammatic view to illustrate the parts when the switch of the electrode holder is closed.

Indicated generally at 19 is a current-responsive manually actuated switch assembly including a longitudinally disposed solenoid coil 20, the windings 21 of which being electrically connected at 22 to the rod element 15. The windings at their other end have a lead 23 electrically connected at 24 to an elongated rearwardly projecting spring finger 25 which terminates in an electrical contact element 26. Secured to the forward face 27 by means of machine screws or the like is a forwardly projecting S-shaped spring finger 28 the upper portion 29 of which having an initial set which normally urges the same in the direction indicated by the arcuate direction arrows of the drawing. Portion 29 of the spring finger includes on its upper surface a contact portion 30 engageable with the contact portion 26 as seen in Figures 1 and 3. Depending from the portion 29 beneath the contact portion 30 is a triangular shaped integral camming portion 31 which is constructed of any suitable non-conductive material.

Reciprocably received within the solenoid coil 20 is a current responsive core or armature 32 having secured at its rear end an enlarged disc 33 which has projecting upwardly therefrom a camming portion 34 of a suitable electrical insulating material. The face 35 of the camming portion is slidingly engageable with the face 36 of the camming portion 31.

Depending from the disc 33 is a support portion 37 which has extending forwardly therefrom and integral therewith an elongated rod 38 which projects through a transversely apertured abutment element 39 integral with the outer casing of the solenoid coil 20. A suitable stop washer 40 is fixed to the terminal end of the rod 38. The rear end of the rod 38 is threaded at 41 and receives thereon an adjusting nut 42 providing a stop for one end of the compression spring 43, the other end of the spring abuttingly engaging portion 39. The spring 43 will normally urge the armature or core toward the left to the position shown in Figure 2. When this occurs the inherent resiliency of the portion 29 of the S-shaped spring will cause the contact element 30 to move away from the contact 26 and the circuit therebetween will be broken and no current wil flow to the windings of the solenoid. Likewise no current will flow to the electrode 18. The camming portion 34 is also constructed of a non-conducting material to prevent current from being transmitted to the operator during welding operations.

Extending upwardly from a suitable support plate 44 is a pair of spaced support elements 45 (only one being shown) which have extending therethrough a transverse pivot element 46 pivotally supporting a trip lever 47 which extends angularly through an elongated longitudinal slot 48 in the body member 2. The lever 47 includes at the pivot pin 46 an upwardly and forwardly extending force transmitting portion 49 abuttingly engageable with the disc 33 for moving the armature 32 to the position shown in Figure 1, the cam portion 34 thereof engaging the cam portion 31 and moving the contacts 26 and 30 into engagement. When this occurs, current will flow from the cable 9 to the electrode 18 and the solenoid coil will be energized to hold the contacts 26 and 30 into closed relationship. This occurs if the electrode 18 is grounded on a work piece W, and after such grounding occurs, the trip lever can be released and manual pressure need not be applied thereto in order to occasion a flow of current to the electrode. However, when the electrode 18 is removed from the work piece, current will no longer flow to energize the solenoid windings and the spring 43 will be effective to urge the armature 32 to the position shown in Figures 2 and 4, breaking the connection between the contacts 26 and 30.

Figure 4:
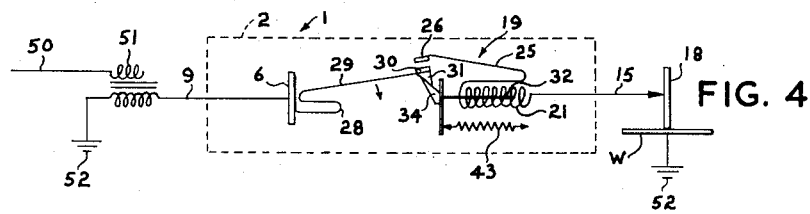
Figure 4 is a view similar to Figure 3 showing the position of the parts when the switch of the electrode holder is open.

Considering Figure 4, the "Switch open" condition, a conductor 50 leading in from a source of current conducts current to a transformer 51 which is grounded at 52. A work piece W is also grounded at 52 to complete the circuit for the purpose of performing the welding operation. With the parts in the position shown in Figures 2 and 4, it will be noted, the electrode 18 may engage the work piece W without current flowing through the electrode holder and thus the welding operator does not have to have his protective hood lowered and can readily position the electrode 18 in its proper position for depositing a weld bead. After the electrode 18 has been properly positioned, the trip lever 47 will be pivoted about the pivot pin 46 to close the circuit between the contacts 26 and 30 thus energizing the solenoid windings and as long as the electrode 18 engages the work piece W to complete the circuit to the transformer 51 the solenoid will hold the parts in the position shown in Figures 1 and 3. The trip lever 47 will have been returned to its normal position and when the circuit is broken between the electrode and the work piece the contacts 26 and 30 will be separated and be disposed in their normal open condition as shown in Figures 2 and 4.

The electrode holder will automatically open the circuit and thus provide an increased safety factor over conventional electrode holders. Additionally, inasmuch as the welder does not have to have his hood lowered when the electrode initially contacts the work piece, he may more accurately position the electrode than was heretofore possible and less accidents will occur.

The construction shown embodies the invention in a preferred form, but it is intended that the disclosure be illustrative rather than definitive, the invention being defined in the appended claims.

I claim:

1. An electrode holder for welding equipment comprising a substantially hollow body member, connection means on said body member for connection to a source of current, electrode rod-holding means on said body member, and a current-responsive, manually actuated switch assembly in said body member operatively connected in series between said connection and rod-holding means, said switch assembly including manually actuated operating means for initially activating said switch assembly to cause current to flow between the connection and rod-holding means when a welding rod engages a suitably grounded work piece, said switch assembly including current-responsive holding means activated by operation of said operating means and deactivated when no current flows between said connection and rod-holding means to maintain a current flow between said last mentioned means only when an electrode is grounded to a work piece and said operating means is in a normal inoperative position.

2. The structure of claim 1 in which said switch assembly includes a pair of normally spaced and engageable electrical contact elements respectively connected in series to said connecting and rod-holding means, said current-responsive holding means is connected in series between one of said contact elements and said rod-holding means, said current-responsive holding means includes a current-responsive force transmitting portion operatively connected to close the circuit between said contact elements, biasing means normally urging said force transmitting portion out of contact-closing relationship, said operating means includes a portion engageable with said force transmitting portion to initially close the circuit between said contact elements in opposition to said biasing means.

3. The structure of claim 2 in which said current-responsive holding means comprises a solenoid coil disposed suitably within said body member, said force transmitting portion comprising an armature axially reciprocal in said solenoid coil, the other of said contact elements is spring biased away from the contact element connected to said current-responsive holding means, the other of said contact elements and said armature include cooperating camming portions effective to close the circuit between said contact elements in response to axial movement of said armature when the solenoid coil is energized.

4. The structure of claim 2 in which said biasing means includes an adjustable portion for imposing a predetermined force on said force transmitting portion.

5. The structure of claim 1 in which said manually activated operating means comprises a lever element extending through said body member and pivotally mounted thereon, said lever element including an angular extension portion engageable with said current-responsive force transmitting portion for transmitting manually applied force on said lever to said current-responsive holding means in opposition to said biasing means.

References Cited in the file of this patent
UNITED STATES PATENTS

| 1,413,304 | Walsh | Apr. 18, 1922 |
| 1,994,554 | Waltmann | Mar. 19, 1935 |

FOREIGN PATENTS

| 761,479 | Germany | Nov. 8, 1951 |